United States Patent
Soules et al.

(10) Patent No.: US 8,650,571 B2
(45) Date of Patent: Feb. 11, 2014

(54) SCHEDULING DATA ANALYSIS OPERATIONS IN A COMPUTER SYSTEM

(75) Inventors: Craig A. Soules, San Francisco, CA (US); Kimberly Keeton, San Francisco, CA (US); Charles B. Morrey, III, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1333 days.

(21) Appl. No.: 12/413,969

(22) Filed: Mar. 30, 2009

(65) Prior Publication Data

US 2010/0251256 A1    Sep. 30, 2010

(51) Int. Cl.
*G06F 9/46*    (2006.01)

(52) U.S. Cl.
USPC .......................................... 718/102; 718/105

(58) Field of Classification Search
None
See application file for complete search history.

(56) References Cited

U.S. PATENT DOCUMENTS

| | | | | |
|---|---|---|---|---|
| 6,748,451 | B2* | 6/2004 | Woods et al. | 709/248 |
| 6,928,577 | B2* | 8/2005 | Moser et al. | 714/4.4 |
| 7,401,238 | B2* | 7/2008 | Lindley et al. | 713/300 |
| 7,454,427 | B2* | 11/2008 | Jackson | 1/1 |
| 7,590,653 | B2* | 9/2009 | Sparks | 1/1 |
| 7,596,618 | B2* | 9/2009 | Basu et al. | 709/226 |
| 7,734,867 | B1* | 6/2010 | Keeton et al. | 711/114 |
| 7,885,928 | B2* | 2/2011 | Harrington et al. | 707/637 |
| 2006/0064481 | A1* | 3/2006 | Baron et al. | 709/224 |
| 2006/0064485 | A1* | 3/2006 | Baron et al. | 709/224 |
| 2008/0222154 | A1* | 9/2008 | Harrington et al. | 707/10 |
| 2010/0199350 | A1* | 8/2010 | Lilibridge et al. | 726/24 |

\* cited by examiner

*Primary Examiner* — Van Nguyen

(57) ABSTRACT

A technique receiving identifiers from a plurality of nodes. Each identifier identifies an associated data object, and at least some of the data objects being replicated on different nodes. The technique includes scheduling analysis of the data objects on the nodes based at least in part on a distribution of replicas of the data objects among the nodes and modeled performances of the nodes.

19 Claims, 3 Drawing Sheets

SCHEDULING DATA ANALYSIS OPERATIONS IN A COMPUTER SYSTEM

BACKGROUND

The invention generally relates to scheduling data analysis operations in a computer system.

An organization may spend considerable amounts of time and resources to locate relevant data on its enterprise computing system for such purposes as responding to litigation-based electronic discovery (eDiscovery) requests, performing information worker document searches and performing information technology (IT) utilization trending. Locating the relevant data typically involves executing data analysis programs on the various machines (desktops, laptops, file servers, SharePoint sites, email servers, etc.) of the system. If the data analysis programs are not scheduled for execution in an efficient manner, machines having preexisting heavy workloads may become overwhelmed, and the organization may suffer significant productivity losses due to data analysis interruptions.

DETAILED DESCRIPTION

Traditionally, an organization may conduct data analysis operations (operations that search for data according to certain search criteria, for example) on its enterprise computing system by independently scanning each node (desktops, laptops, file servers, SharePoint sites, email servers, etc.) of the system for the relevant data. However, such an approach typically has a detrimental impact on computer performance and results in inefficient use of time and money, as replica files or documents are scanned on the different nodes multiple times. Thus, machines with heavy work loads may become overwhelmed with the additional overhead that is introduced by the data analysis; active users may be frustrated with the loss of productivity, which is caused by data analysis interruptions; and the overall productivity of the organization may suffer as a result.

Figure 1:
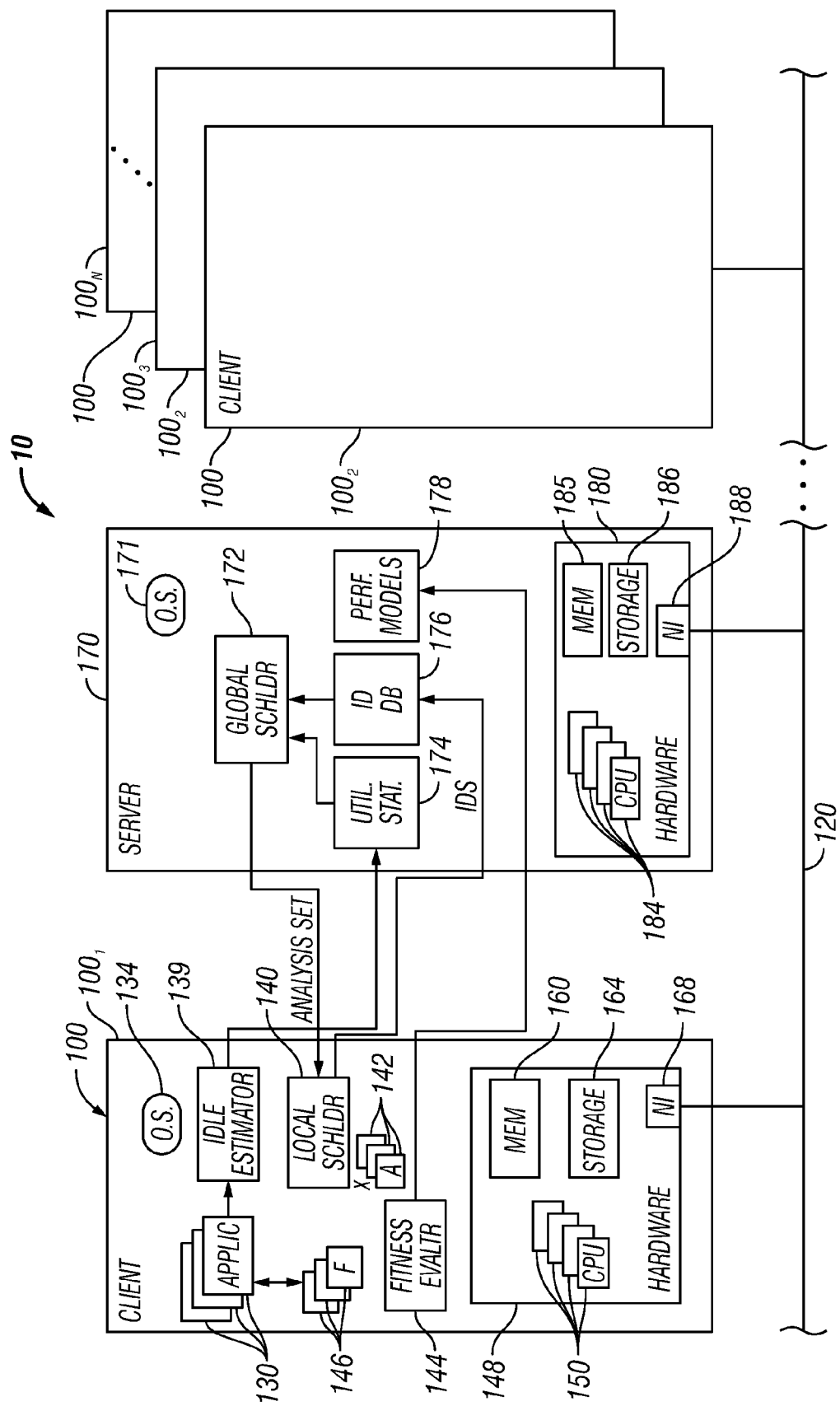
FIG. 1 is a block diagram of an enterprise system according to an embodiment of the invention.

Referring to FIG. 1, in accordance with embodiments of the invention that are described herein, data analysis operations are more efficiently scheduled on a computer system 10 by taking into account the possibility that some of the data objects (such as files 146) to be analyzed may replicated on different nodes of the system 10. In this regard, the system 10 initially scans identifiers for the data objects that are stored on the system 10 to identify data object replicas, and then the system 10 schedules data analysis operations on its nodes accordingly so that each data object that is replicated on multiple nodes is analyzed only once. Furthermore, as described herein, the system 10 considers various other factors for purposes of more efficiently distributing the data analysis operations among its nodes, such as idle times of the nodes, assigned node priorities and modeled node performances.

For the following example, the system 10 contains N physical machines 100 (physical machines $100_1$, $100_2$, $100_3$ ... $100_N$ being depicted in FIG. 1 as examples), which are interconnected by a network 120. As depicted in FIG. 1, the physical machines 100 are clients that are, via the network 120, in communication with another physical machine, which is labeled a "server 170," in FIG. 1. As non-limiting examples, the network 120 may be a local area network (LAN), a wide area network (WAN), the Internet or any other type of communication link. The network 120 may include system buses or fast interconnects, which are not depicted in FIG. 1. As non-limiting examples, the physical machines 100 and 170 may be located within one cabinet (or rack) or, alternatively, the physical machines 100 and 170 may be located in multiple cabinets (or racks).

As non-limiting examples, the system 10 may be an application server farm, a storage server farm (or storage area network), a web server farm, a switch, a router farm, etc. Although five physical machines 100 and 170 are depicted in FIG. 1 for purposes of example, it is understood that the system 10 may contain fewer or more than five physical machines 100, 170, depending on the particular embodiment of the invention.

As further non-limiting examples, each of the physical machines 100 and 170 may be a computer, communication module or any other type of machine. The language "physical machine" indicates that the machine is an actual machine that is made up of software and hardware. Although each of the physical machines 100 and 170 is depicted in FIG. 1 as being contained within a box, a particular physical machine 100, 170 may be a distributed machine, which has multiple nodes that provide a distributed and parallel processing system. It is noted that a "node" may be established by a physical machine or by a virtual machine, depending on the particular embodiment of the invention.

For the specific example described herein, the system 10 is an enterprise system, which contains the clients (formed by the machines 100 and hereinafter called the "clients 100") and a server (formed by the machine 170 and hereinafter called "the server 170"). As a representation of the architecture of each of the clients 100, the client $100_1$ stores various data objects, or files 146, in storage 164 (semiconductor, magnetic or optical storage, as examples). The files 146 may be created by, for example, the execution of various applications 130 on the client $100_1$, as well as the execution of applications on the server 170, or on other clients 100 or on other machines. As depicted in FIG. 1, the client $100_1$ also includes an operating system (OS) 134.

Among its hardware components 148, the client $100_1$ includes one or more central processing units (CPUs) 150, the above-mentioned storage 164 and a memory 160. Additionally, the client $100_1$ includes a network interface (NI) 168 for purposes of communicating with other clients 100 and the server 170 via the network 120.

Similar to the client 100, the server 170 may include various software applications and an OS 171. Additionally, the server 170 may include various hardware components 180, such as one or more CPUs 184, storage 186, a memory 185 and an NI 188.

In accordance with embodiments of the invention described herein, the system 10 employs a two phase scanning technique for purposes of identifying duplicate data objects so that the analysis of each unique data object is performed only once. In the first phase, a local scheduler 140 of each client 100 identifies a unique content identifier (a unique hash, for example) for each new or modified data object that is stored on the client 100. In this regard, the client 100 may, upon the creation or modification of a data object (such as a file 146), process the file with a hash function to generate a unique hash identifier (called a "content identifier" or "ID" herein). In the first phase, each client 100 provides the IDs to the server 170. The provided IDs uniquely identify the data objects that 1.) are stored on the client 100; and 2.) have been newly created or modified since the last scan.

At the conclusion of the first phase, the server 170 has a set of IDs, which identify the new or modified data objects as well as identify the clients that store the data objects. It is noted that, in view of the IDs, the server 170 is able to recognize when replicas of a particular data object are stored on multiple clients 100. A global scheduler 172 of the server 170, in general, analyzes the IDs that are provided by the clients 100 and schedules the analyses of the associated data objects among the clients 100.

More specifically, in the second phase of the two phase scanning technique, the global scheduler 172 analyzes the IDs for purposes of detecting data objects that are duplicates. In this regard, the global scheduler 172 assigns the analysis of a unique data object to only one of the clients 100, regardless of whether one or more replicas of the data object exist on other clients 100. Running relatively costly content analysis routines only once for each unique instance of the data objects substantially reduces the amount of work used to perform the data analysis operations, as compared to conventional data analysis techniques.

Furthermore, the global scheduler 172 takes into account such factors as client performance models, client idle times and specified client priorities for purposes of minimizing the impact on foreground workloads and allowing load shedding from the busiest clients 100. As further described below, the techniques that are described herein may also delay analysis work by trading off the "freshness" of the analyzed data objects against the impact that the analysis would have on the foreground workload. In this regard, as described herein, the global scheduler 172, in accordance with some embodiments of the invention, purposely introduces delays in scheduling the analyses of the data objects so that the data objects created on particularly busy days may be analyzed during less busy days. The delays also provide the opportunity for additional replication or even for temporary data to be deleted, obviating the need for any analysis to be done on deleted data.

More details regarding the above-described two phase scanning to identify the data objects for analysis may be found in U.S. patent application Ser. No. 12/365,792 entitled, "FEDERATED SCANNING OF MULTIPLE COMPUTERS," which was filed on Feb. 4, 2009, and has the same assignee as the current application.

The second phase of the two phase scanning also involves the communication of instructions (called "an analysis set" herein) from the global scheduler 172 to the local scheduler 140 of each client 100, assuming a data analysis is to be performed on the associated client 100. The analysis set specifies the data analysis work to be performed by the client 100 and includes the IDs of the data objects to be analyzed, the locations of these data objects on the client 100 and the file types. The client 100 locates its copies of the identified data objects and schedules the analyses via its local scheduler 140. After the corresponding analysis operations have complete, the client 100 notifies the server 170 and communicates any relevant results to the server 170.

For example, in accordance with some embodiments of the invention, a particular analysis set may direct a client 100 to scan a set of identified data objects for certain data content. Relevant portions of any found content that corresponds to the search criteria are furnished by the client 100 to the server 170 at the conclusion of the analysis. As also depicted in FIG. 1, the local scheduler 140 may use data analysis plug-ins 142 for purposes of performing the data analysis operations.

If the data object associated with a particular ID that is contained in the analysis set is no longer available on the client 100, the local scheduler 140 notifies the global scheduler 172, which then reschedules the work on another client 100 or removes the work if no other client 100 contains a copy of the data object. After the data object that is associated with a particular ID has been analyzed during phase two, the relevant analysis result information is stored on the server 170, and the data object that corresponds to the ID is not analyzed again, as all future notifications for this ID are ignored. It is noted that the data object may be analyzed again if the corresponding data object is modified, which causes the generation of a new corresponding ID; or if a new analysis is desired.

In accordance with embodiments of the invention described herein, the client 100 includes various features to aid the scheduling decisions that are made by the global scheduler 172. For example, in accordance with some embodiments of the invention, each client 100 includes an idle estimator 139, which provides an indication of the current idle time of the client 100 to the global scheduler 172. As specifically shown in FIG. 1, the idle times may be communicated by the idle estimator 139 to a utility statistics file 174 on the server 170, which is accessed by the global scheduler 172. Each client 100 may also include a fitness evaluator 144 that provides information for client performance models 178 (one for each client 100) that are executed on the server 170. In this regard, to determine whether a client 100 has sufficient idle time to perform a particular analysis of a data object, the server 170 uses the performance model 178 for the client in conjunction with the provided idle time to determine if the analysis can be performed in the idle time.

Globally, the server 170 selects which clients 100 perform the analysis routines on which data objects at what time. The decision of when to perform the analysis is limited by the required freshness, i.e., is limited by a delay that establishes when a particular ID and its associated data object are eligible for scheduling. The decision of where to perform the analysis is controlled by the inter-machine replication for each data object being scanned and other factors that determine the selection of the particular client 100 for the analysis.

In accordance with some embodiments of the invention, the global scheduler 172 primarily considers two factors for purposes of determining which client 100 analyzes which data object (when multiple clients 100 store replicas of the same data object): the modeled performances of the clients 100 and the priority classes of the clients 100. In accordance with some embodiments of the invention, each client 100 provides information for modeling its performance and provides its available idle time during each scheduling period (each day, for example). The client 100 may also be associated with a specified priority class, which may be dynamically assigned via the execution of software or may be pre-assigned by a human administrator, for example.

A client's priority class is an indication of the tolerance of the client 100 to impact on its foreground workload. In this regard, higher priority machines have a relatively higher tolerance to impact, such that clients always shed work that exceeds their idle time to clients of higher priority classes when possible. In an environment with two machine classes (such as a desktop priority class and a laptop priority class), it may be preferable (as an example) to impact the foreground workload on the desktop over the laptop. As a result, the desktops may be assigned higher priorities than laptops. In accordance with embodiments of the invention, the global scheduler 172 may consider it to be always desirable to create impact on a higher priority class. However, in accordance with other embodiments of the invention, a cost model may be evaluated, which takes the priority classes into account.

Using the performance models 178, the global scheduler 172 determines the expected time required for each client 100 to perform the analysis of a given data object. Using the determined expected time, the global scheduler 172 then determines if the analysis fits within the client's available idle time for the scheduling period. In this regard, in accordance with embodiments of the invention, clients with sufficient idle time for the analysis of the data object are considered to be idle, and the other clients 100 are deemed busy. In general, in accordance with some embodiments of the invention, the global scheduler 172 selects the idle client 100 from the highest possible priority class with the most available idle time. If no idle client 100 exists, the global scheduler 172 selects the busy client 100 from the highest priority class that is at least exceeding its idle time threshold.

In accordance with some embodiments of the invention, the load balancing of the system 10 may be improved by batching the scheduling of eligible content, which has met the specified delay period into scheduling periods (one scheduling period per day, for example). In this regard, at the beginning of the scheduling period, the global scheduler 172 orders the eligible data objects using the priority classes of the clients that store replicas of these objects. The global scheduler 172 first sorts the IDs in order of increasing maximum priority class. If two IDs have the same maximum priority class, then the next lower priority class is compared.

The global scheduler 172 then sorts equivalent IDs in order of increasing numbers of available clients at the highest priority class. If the counts for one priority class are equal, the global scheduler 172 uses the counts at the next lower priority class. In this regard, the global scheduler 172 ensures that data objects with only a single replica in a priority class are ordered before those that have multiple replicas in the same class (or in multiple classes). More generally, data objects with fewer replicas on lower priority machines will be ordered before objects with more replicas on lower priority machines, or objects that also have replicas on higher priority machines.

For example, with three priority classes A greater than B greater than C, a first ID with two replicas on A priority clients 100 and one replica on a C priority client 100 would be scheduled after a second ID with a single replica on a C priority client. However, this first ID would be scheduled before a third ID with three replicas on A priority clients and one replica on a C priority client. This ordering ensures that high priority machines are not unnecessarily burdened with additional analysis work.

In accordance with some embodiments of the invention, the global scheduler 172 provides load balancing across time by opportunistically analyzing data ahead of schedule, otherwise referred to as a "work-ahead" feature of the global scheduler 172. In this manner, after all of the eligible data objects have been scheduled for a particular scheduling period, the global scheduler 172 identifies the set of clients 100 that have remaining idle time. The global scheduler 172 then identifies any unscheduled content on these clients 100, orders the content first by remaining delay and then orders the content by ordering number. The global scheduler 172 schedules additional work on the clients 100 until the idle times are completely filled or there are no more analysis operations to be scheduled.

Figure 2:
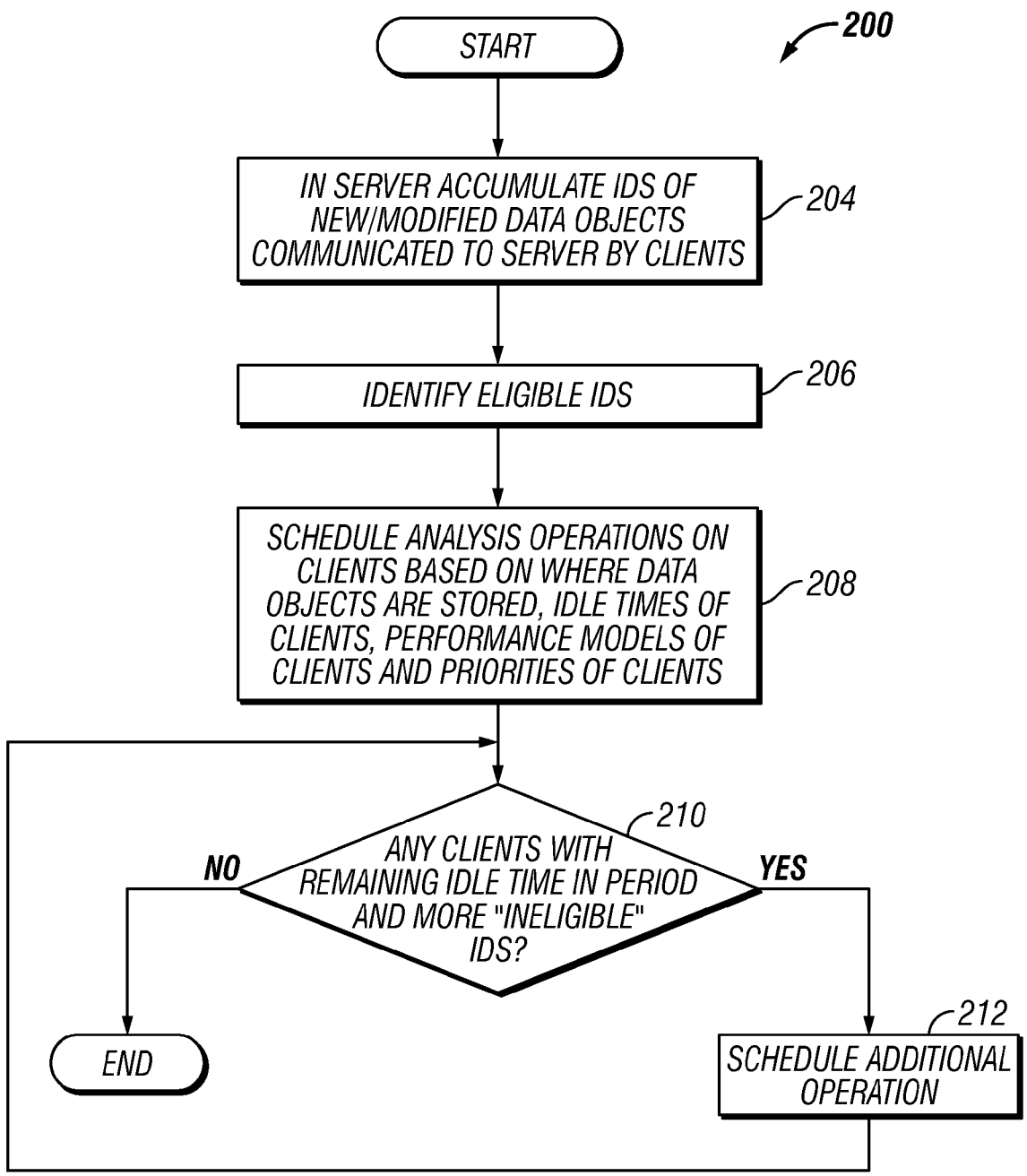
FIG. 2 is a flow diagram depicting a technique to schedule data analysis operations on clients of the enterprise system of FIG. 1 according to an embodiment of the invention.

To summarize, in accordance with some embodiments of the invention, the global scheduler 172 performs a technique 200 that is depicted in FIG. 2. Pursuant to the technique 200, in a server, IDs are accumulated of new/modified data units that are communicated to the server by clients. From the accumulated IDs, eligible IDs are identified, pursuant to block 206. The technique 200 includes scheduling (block 208) analysis operations on clients based on where the data objects are stored, idle times of the clients, performance models of the clients and the priorities of the clients. A determination is then made, pursuant to diamond 210, whether clients with remaining idle time are in the period and more ineligible IDs exist. If so, then additional analysis operations are scheduled, pursuant to block 212, until no more idle time remains or no more data objects are left for processing.

Referring back to FIG. 1, based on the analysis set, the local scheduler 140 centralizes the decisions of what to analyze, when to analyze it and the schedule of analysis plug-ins 142 to execute. This approach prioritizes analyses that might otherwise be run sequentially on a particular data object and as a result, minimizes the input/output (I/O) associated with the analyses.

When a client 100 is assigned an analysis set, the local scheduler 140 initially creates a separate thread for each of the requested analysis routines. The local scheduler 140 then prefetches the data objects and feeds the data objects into a buffer, which is read by the analysis routines in parallel. This approach ensures that both the CPU and I/O subsystem are active and also ensures that the I/O is minimized by reading the data only once.

Although there is no limit on the activities of analysis routines, the techniques that are described herein are optimized for data analysis routines that perform single-pass data analysis and are stateless between files. As specific examples, these data analysis routines may include content hashing or fingerprinting routines, term or feature extraction routines, type identification and virus scanning routines, etc. The state of children may also be collected by directories, allowing the creation of hierarchical analysis routines.

Figure 3:
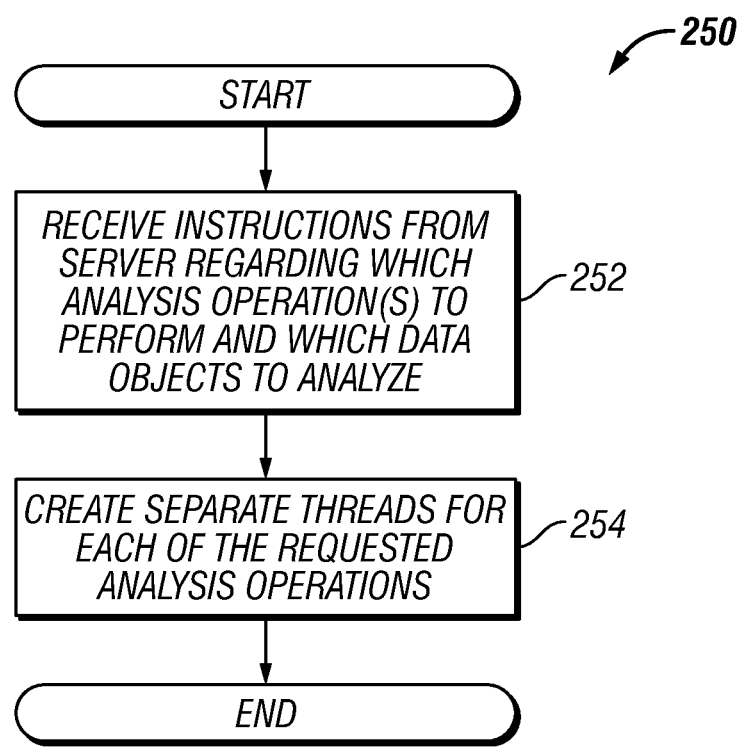
FIG. 3 is a flow diagram depicting a technique to regulate data analysis operations that are conducted on a client of the system of FIG. 1 according to an embodiment of the invention.

Referring to FIG. 3, in accordance with embodiments of the invention described herein, the local scheduler 140 may perform a technique 250 that is generally depicted in FIG. 3. Pursuant to the technique 250, in the client 100, instructions are received from the server 170, which instruct the client 100 as to which analysis operations are to be performed and identify the data objects for the analysis. The client 100 creates (block 254) separate threads for each of the requested analysis routines, in accordance with embodiments of the invention.

Other embodiments are contemplated and within the scope of the appended claims. For example, in accordance with some embodiments of the invention, the global scheduler 172 may consider, or weigh in, priorities of the data objects when scheduling the analyses of the objects. In this manner, each data object may be assigned a relative priority, or importance, based on such factors as how updated, or fresh, the analyses of the data object needs to be. For example, it may be sufficient for a given type of data object to be analyzed monthly (and be assigned a relatively lower priority), versus another type of data object that may need to be analyzed weekly (and be assigned a relatively higher priority). Another factor influencing the priority of a particular data object is the degree of completeness of the object. For example, some data objects may be draft documents that are considered to be less important versus other data objects that may be final version documents that constitute official records. Other and/or different factors may be considered when assigning the priorities, in accordance with other embodiments of the invention.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:
    receiving identifiers from a plurality of nodes of a computer system, each identifier identifying an associated data object and at least some of the data objects being replicated on different nodes of said plurality of nodes; and
    processing the identifiers on a processor-based machine to schedule analyses of the data objects on the nodes based at least in part on a distribution of replicas of the data objects among the nodes and modeled performances of the nodes.

2. The method of claim 1, wherein the act of receiving the identifiers comprises communicating with the nodes to allocate which nodes process the data such that multiple replicas of the data are not processed by the nodes.

3. The method of claim 1, wherein the act of processing comprises scheduling the analyses based on priorities assigned to the nodes.

4. The method of claim 1, wherein
    the act of processing comprises scheduling the analyses based on idle times of the nodes.

5. The method of claim 1, further comprising:
    for each identifier, determining each of the nodes which stores the associated data object; and
    selecting one of the nodes that stores the associated data object to perform an analysis of the data.

6. The method of claim 1, further comprising:
    for each received identifier, regulating a delay between when the identifier is received and when the associated data object is eligible to be scheduled for analysis.

7. The method of claim 6, wherein the processing scheduling comprises:
    for a given period of time, scheduling analysis operations on the nodes for all of the currently eligible data; and
    upon determining during the period of time that all of said currently eligible data has been processed in the analysis operations, scheduling analysis of the data objects designated as being ineligible based at least in part on the idle times.

8. The method of claim 1, wherein the processing comprises:
    ordering the analyses such that analysis of a data object having a relatively small number of one or more replicas is assigned a higher order for analysis than an order assigned to a data object having a relatively larger number of replicas.

9. The method of claim 1, wherein the act of processing comprises scheduling the analyses based on priorities assigned to the data objects.

10. Instructions stored on a non-transitory computer-usable storage medium that when executed cause a computer to:
    receive identifiers from a plurality of nodes, each identifier identifying an associated data object and at least some of the data objects being replicated on different nodes of said plurality of nodes; and
    schedule analyses of the data objects on the nodes based at least in part on a distribution of replicas of the data objects among the nodes and modeled performances of the nodes.

11. The instructions of claim 10, wherein the instructions when executed cause the computer to further base the scheduling of the analysis on priorities assigned to the nodes.

12. The instructions of claim 10, wherein the instructions when executed cause the computer to further base the scheduling on idles times of the nodes.

13. The instructions of claim 10, wherein the instructions when executed cause the computer to, for each received identifier, regulate a delay between when the identifier is received and when the associated data object is eligible to be scheduled for analysis.

14. An apparatus comprising:
    a server to:
        receive identifiers from a plurality of clients, each identifier identifying an associated data object and at least some of the data objects being replicated on different clients of the plurality of clients; and
        schedule analyses of the data objects on the clients based at least in part on a distribution of replicas of the data objects among the clients and modeled performances of the clients.

15. The apparatus of claim 14, wherein the server further bases the scheduling of the analysis on priorities assigned to the clients.

16. The apparatus of claim 14, wherein the server further bases the scheduling of the analysis of the data on the clients based on idle times of the clients.

17. The apparatus of claim 14, wherein the server, for each received identifier, regulates a delay between when the identifier is received and when the associated data object is eligible to be scheduled for analysis.

18. The apparatus of claim 14, wherein the server orders the analyses such that the server assigns analysis of a data object having a relatively small number of one or more replicas a higher order than an order that the server assigns to a data object having a relatively larger number of replicas.

19. The apparatus of claim 14, wherein the server further bases the scheduling of the analyses on priorities assigned to the data objects.

* * * * *

UNITED STATES PATENT AND TRADEMARK OFFICE
CERTIFICATE OF CORRECTION

PATENT NO.         : 8,650,571 B2
APPLICATION NO.    : 12/413969
DATED              : February 11, 2014
INVENTOR(S)        : Soules et al.

Page 1 of 1

It is certified that error appears in the above-identified patent and that said Letters Patent is hereby corrected as shown below:

In the Claims

Column 7, lines 39-40, Claim 7, after "processing" delete "scheduling".

Column 8, line 20, Claim 12, delete "idles" and insert -- idle --, therefor.

Signed and Sealed this
Tenth Day of June, 2014

Michelle K. Lee
*Deputy Director of the United States Patent and Trademark Office*